United States Patent
Chow et al.

(10) Patent No.: US 9,241,013 B2
(45) Date of Patent: Jan. 19, 2016

(54) CALLER NAME AUTHENTICATION TO PREVENT CALLER IDENTITY SPOOFING

(75) Inventors: Stanley TaiHai Chow, Ottawa (CA); Vinod Choyi, Ottawa (CA); Dmitri Vinokurov, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 1626 days.

(21) Appl. No.: 11/699,330

(22) Filed: Jan. 30, 2007

(65) Prior Publication Data

US 2008/0181379 A1     Jul. 31, 2008

(51) Int. Cl.
    *H04L 12/28*     (2006.01)
    *H04L 29/06*     (2006.01)
    *H04L 1/16*     (2006.01)
    *H04M 1/57*     (2006.01)
    *H04M 3/38*     (2006.01)
    *H04M 3/42*     (2006.01)
    *H04M 7/00*     (2006.01)

(52) U.S. Cl.
    CPC ........ *H04L 65/1079* (2013.01); *H04L 63/0823* (2013.01); *H04L 63/1441* (2013.01); *H04L 63/1483* (2013.01); *H04M 1/57* (2013.01); *H04M 3/382* (2013.01); *H04M 3/42059* (2013.01); *H04M 3/42314* (2013.01); *H04M 7/006* (2013.01); *H04Q 2213/13095* (2013.01); *H04Q 2213/13103* (2013.01); *H04Q 2213/13139* (2013.01)

(58) Field of Classification Search
    USPC .................................. 370/252, 352, 401, 386
    See application file for complete search history.

(56) References Cited

U.S. PATENT DOCUMENTS

| | | | |
|---|---|---|---|
| 6,324,271 B1 | 11/2001 | Sawyer et al. | |
| 7,239,688 B1* | 7/2007 | Sayko et al. | 379/93.02 |
| 7,716,469 B2* | 5/2010 | Bhatnagar et al. | 713/156 |
| 7,920,680 B2* | 4/2011 | Saha et al. | 379/88.02 |
| 8,924,269 B2* | 12/2014 | Seubert | G06Q 10/06 705/35 |
| 2002/0078347 A1* | 6/2002 | Hericourt et al. | 713/156 |
| 2002/0087858 A1 | 7/2002 | Oliver et al. | |
| 2005/0190904 A1 | 9/2005 | Anupam et al. | |
| 2005/0201363 A1 | 9/2005 | Gilchrist et al. | |
| 2006/0018445 A1 | 1/2006 | Mittal | |
| 2006/0120345 A1 | 6/2006 | Sung et al. | |
| 2006/0120377 A1 | 6/2006 | Caballero-McCann et al. | |
| 2006/0248205 A1* | 11/2006 | Randle et al. | 709/229 |
| 2007/0121866 A1* | 5/2007 | Kniveton et al. | 379/201.1 |

FOREIGN PATENT DOCUMENTS

WO     02/37373 A1     5/2002

OTHER PUBLICATIONS

Ling Wang et al., A Network Based Authentication Scheme for VoIP, Communications Technology, 2006. ICCT '06 International Conference CE On, IEEE, PI, Nov. 2006 pp. 1-4 XP031071823.
Srinivasan R. et al., Authentication of Signaling in VoIP Applications, Communications, Oct. 2005, NJ, IEEE, pp. 530-533 XP01086838.
Chinese Office Action dated Mar. 11, 2013 (and its English Translation) in corresponding Chinese Application No. 2008800035573.

* cited by examiner

*Primary Examiner* — John Pezzlo
(74) *Attorney, Agent, or Firm* — Kramer & Amado, P.C.

(57) ABSTRACT

Caller name is authenticated using authentication certificates issued by a registration authority that registers callers who wish to terminate calls to callers subscribed to the registration authority. In one embodiment, the authentication certificates are sent to a called device or a proxy for the called device via a path that is separate from the call setup path. An indication is conveyed to the called party to indicate whether the caller name was successfully authenticated.

20 Claims, 4 Drawing Sheets

CALLER NAME AUTHENTICATION TO PREVENT CALLER IDENTITY SPOOFING

CROSS-REFERENCE TO RELATED APPLICATIONS

This is the first application filed for the present invention.

MICROFICHE APPENDIX

Not Applicable.

TECHNICAL FIELD

The present invention relates in general to the provision of telephone services over a packet network and/or switched circuit network and, in particular, to caller identification authentication to prevent phishing attacks based on calling party name spoofing.

BACKGROUND OF THE INVENTION

Caller ID, as traditionally provided by the switched circuit Public Switched Telephone Network (PSTN), was reasonably secure. However, the introduction of Voice over Internet Protocol (VoIP) has made it relatively simple to change caller ID so that a real identity of a calling party is concealed. Changing caller ID name is referred to as "caller spoofing", and it is generally done for fraudulent purposes.

In the VoIP domain, caller spoofing is so simple that there are web sites dedicated to permitting anyone to place calls using any caller ID they desire. Examples of such web sites can be found at telespoof.com and spooftel.com. Since it is now possible to originate calls from a VoIP network that are terminated in the PSTN, caller ID can no longer be trusted as a reliable caller authentication system. Spoofing only the displayable Caller ID Name part of Caller ID is even easier, because this can be arbitrarily chosen by the caller either during caller subscription or on a call-by-call basis in VoIP and this cannot be controlled by currently adopted authentication mechanisms, even those available in IP Telephony. Furthermore, even if caller ID name could be authenticated using prior art methods, certain "legitimate" names may be maliciously selected to resemble authentic trusted names, and this creates another opportunity for phishing attacks.

Identity theft has also become a serious problem nearly everywhere. The United States Justice Department estimated in 2002 that up to 700,000 people in the United States were victimized by identity thieves. More recent analyses place the estimates much higher. A recent report on identity theft warned that there is likely to be "mass victimization" of consumers within the next two years.

Caller spoofing provides a new way to perpetrate Identity Theft using a new variation of the old computer phishing attack. In this new variation, instead of using web pages, the identity thief calls the victim, and claims to be calling from a financial institution, for example. The identity thief impersonates an employee of the financial institution and asks for account information and passwords. If the identity thief spoofs the Caller name to appear as if the call is actually originating from the financial institution's telephone system, then there is a higher probability that the thief will succeed in obtaining the information they desire.

It is therefore highly desirable to provide a caller authentication system that is not susceptible to caller name spoofing.

SUMMARY OF THE INVENTION

It is an object of the invention to provide a method and system for caller authentication that permits a caller's name to be authenticated to a called party.

The invention therefore provides a caller authentication application that receives caller authentication certificates associated with an incoming call, the authentication certificates having been issued by a registration authority to a registrant wishing to provide authenticated caller identification to parties called by the registrant, and authenticates that the incoming call was originated by the registrant using the authentication certificates received.

The invention therefore provides a caller authentication application that receives an authentication certificate associated with an incoming call, the authentication certificate having been issued to a registrant wishing to provide an authenticated caller name to parties called by the registrant, and authenticates the caller name by establishing an authentication dialog with equipment that sent the authentication certificate.

The invention further provides a method of providing caller authentication to a called party, comprising: receiving an authentication certificate when a call to the called party is initiated; examining the authentication certificate to determine if it was issued by a registration authority to which the called party has subscribed; establishing an authentication dialogue with a sender of the authentication certificate; and authenticating a caller name associated with the authentication certificate using information exchanged during the authentication dialogue.

The invention yet further provides an Internet Protocol public branch exchange (IP/PBX) comprising: program instructions for receiving an authentication certificate when a call to a called party served by the IP/PBX is received; program instructions for examining the authentication certificate to determine if the authentication certificate was issued by a registration authority to which the IP/PBX has been subscribed; and program instructions for establishing a dialogue with a sender of the authentication certificate to authenticate a caller name associated with the authentication certificate if the certificate was issued by a registration authority to which the IP/PBX has been subscribed.

The invention also provides a network gateway for providing an interface between a packet network and a switched circuit network, comprising: program instructions for receiving an authentication certificate when a call to a called party served by the network gateway is received; program instructions for examining the authentication certificate to determine if the authentication certificate was issued by a registration authority to which the network gateway has been subscribed; and program instructions for establishing a dialogue with a sender of the authentication certificate to authenticate a caller name associated with the authentication certificate if the authentication certificate was issued by a registration authority to which the network gateway has been subscribed.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

The invention permits interested parties to offer authenticated caller name, logo or other means of identification to anyone they call that has access to equipment programmed in accordance with the invention. Equipment programmed in accordance with the invention includes: at least one registry for storing unique caller names, logos or other means of identification associated with calling parties that wish to provide caller authentication to called parties; and, caller authentication applications. The caller authentication applications receive an authentication certificate associated with an incoming call originated by an interested party and use the authentication certificate to authenticate the caller name, logo or other means of caller identification. An indication is conveyed to the called party to indicate whether a caller name, logo or other means of caller identification associated with an incoming call has been authenticated.

Figure 1:
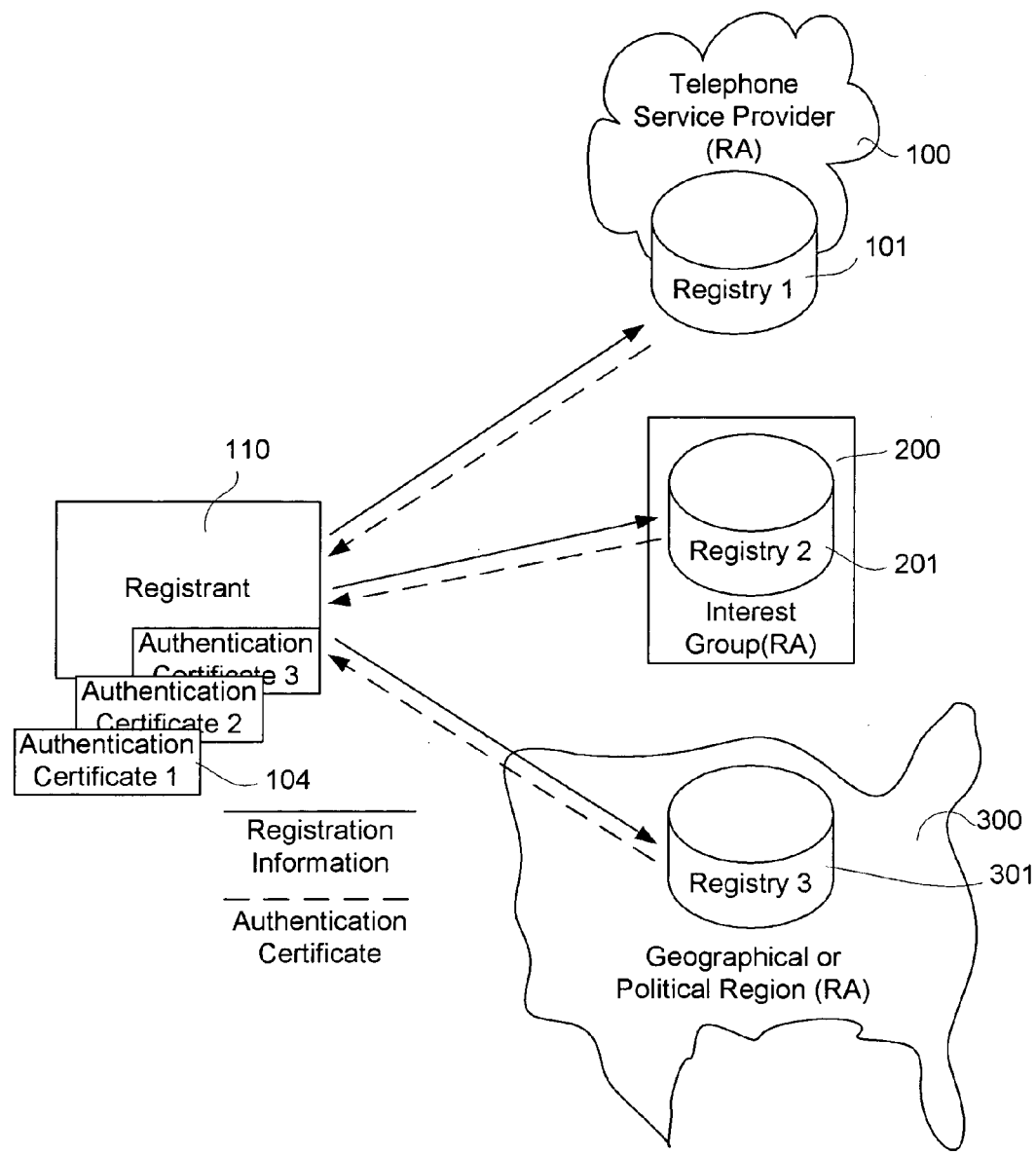
FIG. 1 is a schematic diagram of a registration infrastructure and process for caller identity registration in accordance with the invention.

FIG. 1 is a schematic diagram of an exemplary registration infrastructure and a process for registration of caller name, logo or other means of caller identification in accordance with the invention. In this example, a registrant 110 registers with three separate registries: registry 101 is operated by a registration authority (RA) that is a telephone service provider 100; registry 201 is operated by a RA that is an interest group (such as a trade association), and registry 301 is operated by a RA that is a geographical or political region (perhaps a government or other official entity). Registrant 110 does this to provide authenticated caller name, logo or other caller identification (hereinafter simply "caller name") to called parties that subscribe to any one of the available registries. That is, registrant 110 can be authenticated to a called party if and only if the called party subscribes to one or more of the available registries, in this example, registries 101, 201 or 301.

Each registry is operated by the RA. The RA may be any public or private organization interested in providing an authenticated caller name registry. A higher-level authority is not required to sanction a RA. End-users, service suppliers, and/or equipment suppliers can determine if any given registry is trustworthy, and subscribe to only those registries determined to be trustworthy. Each registry is composed of two main parts—the RA (Certification Authority in X.509 parlance) and a database of names, logos or other means of caller identification. Each registry serves a predetermined subscriber group, region and/or a predefined interest group. A region served by one registry may overlap a region served by another registry, and two or more registries may serve the same region.

For example, the registry 101 is operated by a telephone service provider 100 that wishes to provide an authenticated caller service to any company, public or government organization, or other registrant 110 who wishes to provide authenticated caller name to called parties served by the telephone service provider 100.

As a further example, the registry 201 is operated by the interest group 200, such as the Canadian Bankers Association®, which maintains the registry 201 to provide authenticated caller registration services to its bank members.

As yet a further example, the registry 301 is associated with a geographical or political region, such as New York State; the Province of Ontario; the City or Toronto; the greater Chicago area; etc. and is operated by a corresponding government agency or other official entity 300.

In one embodiment of the invention, the only responsibility borne by the RAs 100, 200 or 300 is to ensure proof of identity of any registrant 110, and ensure that it does not register any duplicate caller name, logo or other means of caller identification for different registrants 110. In this embodiment, the registry 101 (which consists of the database and the RA) can be freely inspected by the public and it is the responsibility of registrants 110 and other interested parties to police the registries 101, 102 and 103 in order to ensure that a confusingly similar or misleading caller identity is not registered by another registrant 110. When a registrant 110 is registered, the RA issues an authentication certificate 104. The certificate certifies that the registered caller identity is bound to the registrant's public key (which is in turn implicitly paired with the registrant's private key).

Registration Process

The authentication certificate 104 provided to each registrant 110 by a registry can conform to any known authentication system, and each registry can use a different authentication system without departing from the scope of the invention. When the registrant's name is recorded in a registry, certificates are provided to the registrant 110 to permit caller authentication to be performed. The certificates can be based on any public key infrastructure scheme like X.509.

If X.509 certificates are used for the authentication certificates provided to the registrants 110, in one embodiment the registration process proceeds as follows, using RA 100 as an example:

1) The RA 100 publishes its public key in its root certificate. This public key is used to verify certificates, so the root certificate must be imported into each device that will perform the caller authentication. Typically, it is assumed a vendor of a telephone will pre-load the root certificates of interest—including any local regional registries, all popular trade and professional registries, etc. in much the same way that Web browsers are pre-loaded with PKI certificates today. There should also be a way for the end user to import more root certificates in the cases where the end user does business in multiple regions or is interested in a specialized registry. As understood by those skilled in the art, there is no limit to how many root public keys can be imported.

2) Each applicant wishing to become a registrant 110, generates its own public/private key pair, submits the public key to the RA 100 along with its name, logo and other means of identification, and any other required registration information and/or documentation.

3) If the RA 100 determines that the applicant in fact owns the name, logo, or other means of caller identification, the RA 100 enters the caller name into the database 100 and uses the private key of RA 100 to sign a certificate that includes the registrant's caller name and the registrant's public key. The RA 100 therefore "vouches" that the registrant's public key is the public key that is bound to the registrant's caller name, and that the registrant is entitled to use that caller name.

4) The registrant 110 now has a signed authentication certificate that attests to its caller name, and the registrant 110 also has the private key that permits the registrant 110 to validate that certificate. It should be understood that the meaning of the authentication certificate is limited. The authentication certificate only signifies that the holder of the private key (which should be registrant 110) is entitled to have its caller name displayed in the jurisdiction of the particular registration authority 100 with which the registrant 110 has registered.

Caller Authentication

Figure 2:
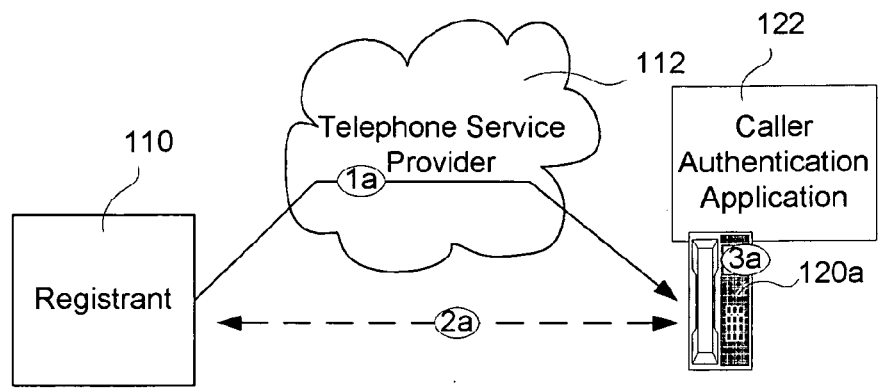
FIG. 2 is a schematic diagram of a caller authentication infrastructure and process performed by a user device executing a caller authentication application in accordance with the invention.
Figure 3:
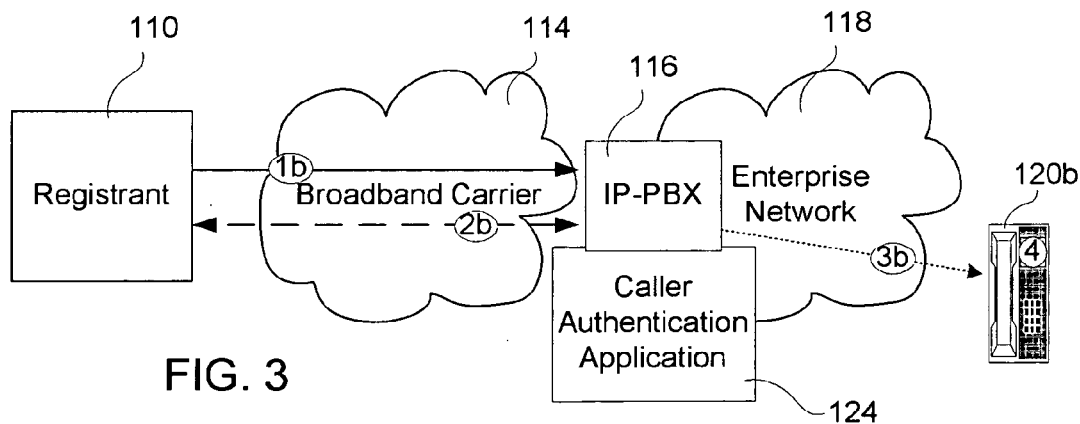
FIG. 3 is a schematic diagram of a caller authentication infrastructure and process performed by an IP/PBX executing a caller authentication application in accordance with the invention.
Figure 4:
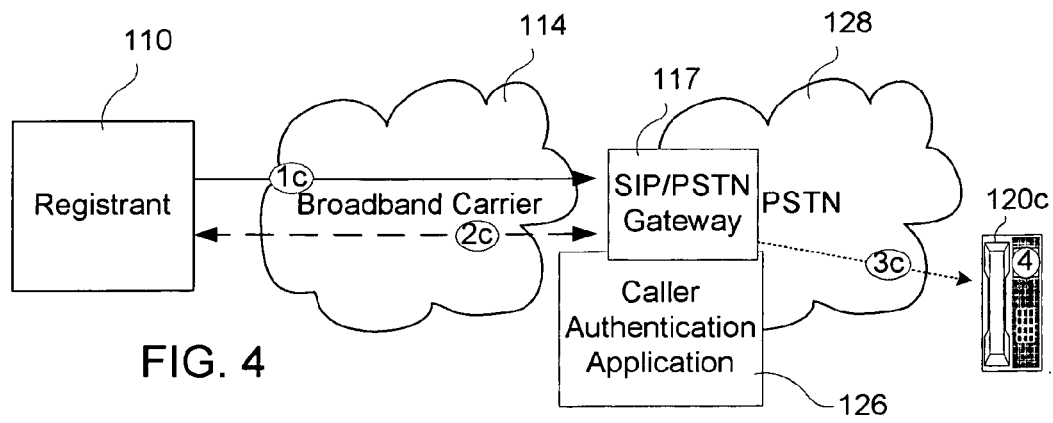
FIG. 4 is a schematic diagram of a caller authentication infrastructure and process performed by a network gateway executing a caller authentication application in accordance with the invention.

FIGS. 2-4 show examples of caller authentication in accordance with one embodiment of the invention. Note that caller authentication does not require a query of the registries 101, 201, 301. In one embodiment, the caller presents its certificate to the called party, or a proxy for the called party, as will be explained below in more detail. In one embodiment, caller authentication is performed after call setup. After the data/voice path is being established, the caller sends its certificate as part of a protocol to verify ownership of the private key corresponding to the certificate. An authentication dialog can be initiated by adding extensions to VoIP signaling protocol or by exchanging a special first signaling packet.

As shown in FIG. 2, in one embodiment of the invention the caller authentication is performed by the called party user device 120a, which is for example an Internet Protocol (IP) telephone. The IP telephone 120a is equipped with a caller authentication application 122. This is the most secure form of caller authentication because it is directly controlled by the called party. When the registrant 110 initiates a call to the called party, call setup (1a) proceeds through the telephone service provider network(s) in a manner well known in the art. The call setup messages may carry regular caller information, but that information is ignored by the called party user device 120a if a caller authentication dialogue (2a) is commenced when the registrant 110 sends its authentication certificate, using one of the communications protocols referenced above. The caller authentication application 122 conducts the authentication dialogue with equipment used by registrant 110, and authenticates the authentication certificate obtained during the dialogue. The authenticated caller name is then conveyed (3a) to the called party, as will be explained below with reference to FIGS. 5a-5c and 6a-6d.

As shown in FIG. 3, in accordance with another embodiment of the invention the caller authentication is performed by a public branch exchange, such as an Internet Protocol Public Branch Exchange (IP-PBX) 116 which serves as a proxy for called parties connected to an enterprise network 118. In this embodiment, call setup (1b) proceeds by conventional means through one or more networks, in this example a broadband carrier network 114. During or after call setup the registrant 110 initiates a caller authentication dialogue (2b) with the IP-PBX 116, which is provisioned with a caller authentication application 124. The IP-PBX authenticates the registrant's authentication certificates and conveys (3b) a caller authentication message to a user device 120b of the called party. The user device displays the caller authentication message as will be described below in more detail with reference to FIGS. 5a-5c and 6a-6d.

As shown in FIG. 4, in accordance with another embodiment of the invention the caller authentication is performed by a network gateway 117, such as a Session Initiation Protocol (SIP)/Public Switched Telephone Network (PSTN) gateway that serves as a proxy for called parties connected to a Public Switched Telephone Network (PSTN) 128. In this embodiment, call setup (1c) proceeds by conventional means through one or more networks, in this example a broadband carrier network 114 to the SIP/PSTN gateway 117. During or after call setup the registrant 110 initiates a caller authentication dialogue (2c) with the SIP/PSTN gateway 117, which is provisioned with a caller authentication application 126. The SIP/PSTN gateway 117 authenticates the registrant's authentication certificate and conveys (3c) a caller authentication message to a user device 120c of the called party using the standard caller name field in Signaling System 7 (SS7) Initial Address Message (IAM), for example. The user device displays the authentication message as will be described below in more detail with reference to FIGS. 5a-5c and 6a-6d.

Figure 5A:
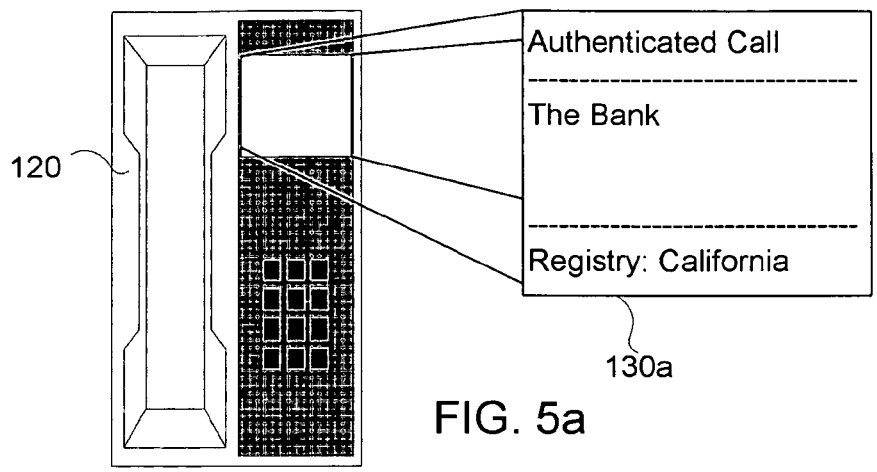
FIGS. 5a-5c are schematic diagrams of user telephone devices displaying caller authentication messages in accordance with the invention.
Figure 5B:
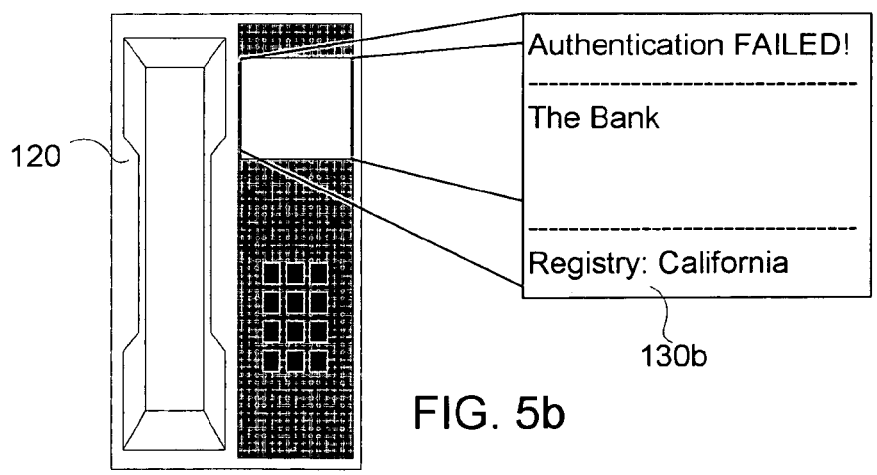
Figure 5C:
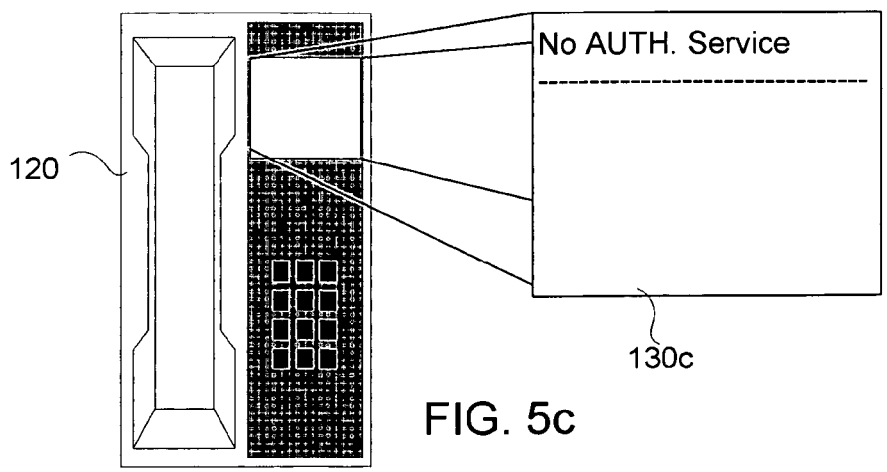

FIGS. 5a-5c show examples of caller authentication messages conveyed to called parties in accordance with one embodiment of the invention. In these examples, the caller authentication messages displayed indicate whether the caller name has been authenticated; the caller name (optionally the logo, etc.); and the registry 101, 201, 301 with which the caller has registered.

FIG. 5a shows an exemplary display format 130a for an authenticated caller name. A first line of the display 130a indicates that the caller name has been successfully authenticated. A second line of the display 130a displays the authenticated caller name. The last line of the display displays the name of the RA, in this example a registry associated with the State of California.

FIG. 5b shows an exemplary display format 130b for a caller that could not be authenticated because authentication failed. As understood by those skilled in the art, caller authentication may fail for any one of a number of reasons. For example: the caller may present a stolen authentication certificate for which the caller does not have the corresponding private key; the authentication certificate cannot be validated with the public key of the CA; a communications failure may have occurred; an authentication dialogue may have been interrupted; etc. A first line of the display 130b indicates that the caller has not been successfully authenticated because caller authentication has failed. A second line of the display 130b displays the caller name contained in the certificate, if available. The last line of the display 130c displays the name of the registry contained in the certificate, if available. To further highlight the fact that authentication failed, the message can be displayed in a bright color, red for example, etc.

FIG. 5c shows an exemplary display format 130c for a caller that could not be authenticated because the caller dnot present a certificate. The first line of the display 130c indicates that the caller has not attempted authentication and the rest of the lines may be blank, as shown, or may display a caller name and/or number extracted from the call setup signaling messages, in which case the fact that authentication was not attempted should be emphasized by highlighting or blinking the no authentication service message.

As will be understood by those skilled in the art, the display formats 130a-130c may not always be practical or desired by a called party. It is therefore contemplated that other forms of call authentication indications may be conveyed to a called party. FIGS. 6a-6d illustrate alternate ways to convey an indication of authenticated caller name to a called party.

Although the examples shown in FIGS. 6a-6d illustrate a specific type of user device (cellular telephone) it should be understood that such indications can be conveyed to most known types of telephone devices.

Figure 6A:
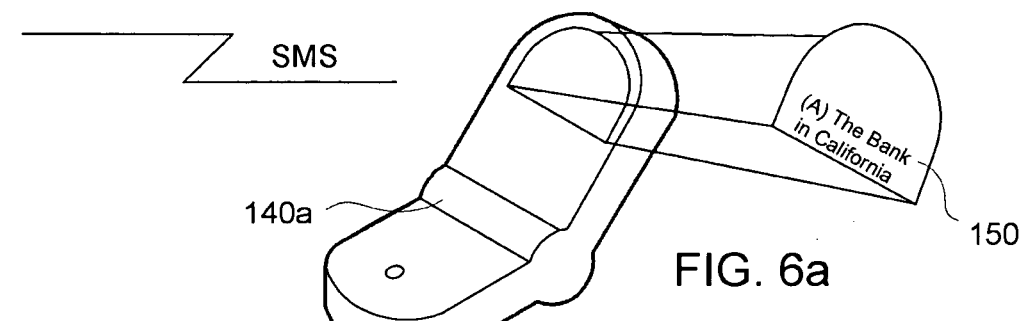
FIGS. 6a-6d are schematic diagrams of different methods of conveying caller authentication indications to called party telephone devices.

As shown in FIG. 6a a caller authentication, or authentication failure, may be conveyed to a called party using an out-of-band message sent concurrently with or after a ringing signal is sent to the user device. In this example, a Short Message Service (SMS) message is sent. The SMS message includes an indication 150 that the caller has been authenticated (A), or not authenticated (NA), which is not shown; and, the caller ID, in this example, "The Bank in California".

Figure 6B:
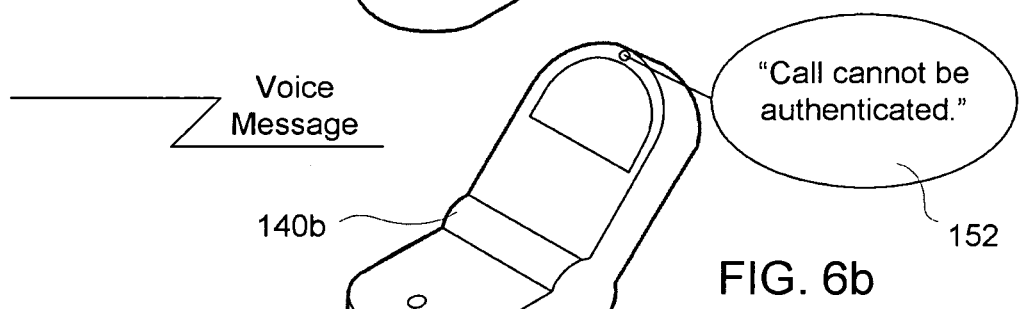

As shown in FIG. 6b, alternatively an in-band voice message can be played when the called party answers the call, to indicate whether the caller could be authenticated. The in-band voice message may be played to the called party after the called party answers, but before the call is "cut through", so that the calling party cannot forge the message. In this example, the called party receives a voice message 152 indicating that the caller could not be authenticated.

Figure 6C:
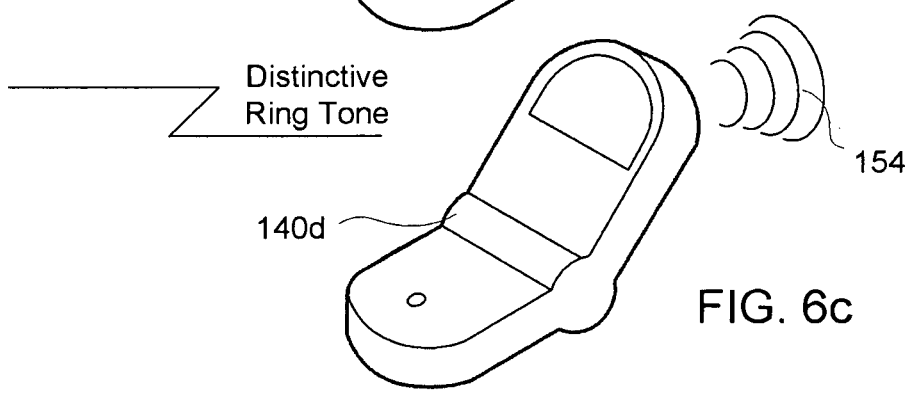

As shown in FIG. 6c, in a further alternative a distinctive ring tone is sent to the called party device. One ring tone 154 indicates an authenticated caller and another ring tone (not shown) indicates a caller name that could not be authenticated.

Figure 6D:
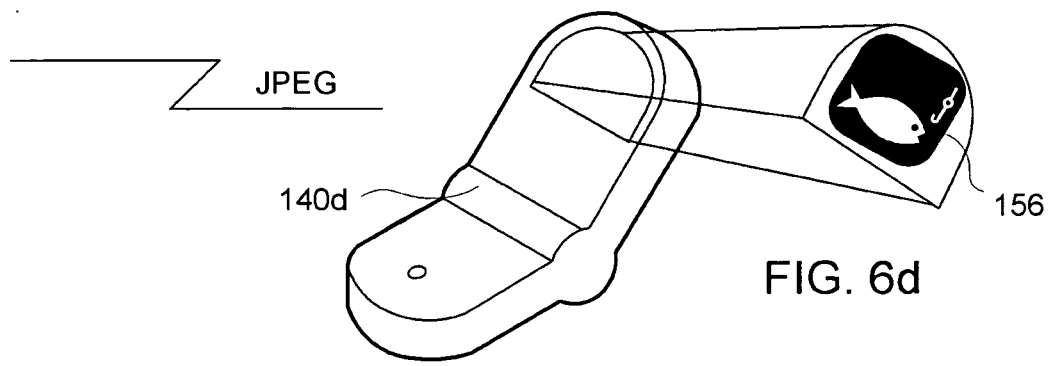

As shown in FIG. 6d, in yet a further alternative an image, for example a .jpeg image is sent to the called party device to indicate whether the caller has been authenticated. In this example, a .jpeg image 156 indicates that the caller could not be authenticated. Another jpeg image (not shown) is used to indicate an authenticated caller name.

As will be understood by those skilled in the art, the specific embodiments of the invention described above are not exhaustive of the methods, applications, or conveyances by which the invention can be implemented. The embodiments of the invention described above are therefore intended to be exemplary only, and the scope of the invention is intended to be limited solely by the scope of the appended claims.

We claim:

1. A method of providing caller authentication to a called party, the method comprising:
    registering registrants in a registry, wherein a particular public key is bound to a respective caller name for each registrant,
    issuing, by a registration authority, an authentication certificate after registering each registrant, wherein the registration authority vouches that each registrant is entitled to use the respective caller name;
    initiating a call to the called party;
    receiving an authentication certificate;
    examining both the received authentication certificate and the caller name to determine if the registration authority to which the called party has been subscribed issued the authentication certificate in association with the caller name;
    establishing an authentication dialog with a sender of the authentication certificate; and
    authenticating the associated caller name using information exchanged during the authentication dialog.

2. The method as claimed in claim 1, wherein receiving the authentication certificate comprises:
    receiving the authentication certificate during call setup over a path separate from a call setup signaling path for the call.

3. The method as claimed in claim 1, further comprising: receiving the authentication certificate via a transport layer security/secure socket layer (TLS/SSL) protocol dialog.

4. The method as claimed in claim 1, wherein the authentication certificate comprises an X.509 certificate.

5. The method as claimed in claim 1, further comprising: conveying to a user device, used by the called party to receive the call, an indication of whether the caller name has been authenticated.

6. The method as claimed in claim 5, performed by a network gateway between a packet network and a switched circuit telephone network, the network gateway serving as a proxy for a user device of the called party connected to the switched circuit telephone network.

7. The method as claimed in claim 5, performed by an Internet Protocol Public Branch Exchange (IP/PBX), the IP/PBX serving as a proxy for a user device of the called party connected to an enterprise network.

8. The method as claimed in claim 5, performed by a Session Initiation Protocol (SIP) proxy for an Internet Protocol telephone used by the called party to receive the call.

9. The method as claimed in claim 5, wherein the indication of whether the caller name was authenticated comprises a text message that is displayed by the user device.

10. The method as claimed in claim 5, wherein the indication of whether the caller name was authenticated comprises a voice message that is conveyed to the user device.

11. The method as claimed in claim 5, wherein the indication of whether the caller name was authenticated comprises a distinctive ring tone applied by the user device.

12. The method as claimed in claim 5, wherein the indication of whether the caller name was authenticated comprises a graphic image displayed by the user device.

13. The method of claim 1, further comprising:
    certifying, with the authentication certificate, that a registered caller name is bound with a public key of a registered caller.

14. The method of claim 1, further comprising:
    importing a root certificate into an authentication device prior to performing the caller authentication.

15. The method of claim 1, further comprising:
    receiving, in the registration authority, a public key and the caller name from the called party.

16. The method of claim 15, further comprising:
    determining, in the registration authority, whether the called party owns the caller name; and
    signing, in the registration authority, the authentication certificate, after determining that the called party does own the received identification.

17. An Internet Protocol public branch exchange (IP/PBX) comprising:
    program instructions for registering registrants in a registry, wherein a particular public key is bound to a respective caller name for each registrant;
    program instructions for issuing, by a registration authority, an authentication certificate after registering each registrant, wherein the registration authority vouches that each registrant is entitled to use the respective caller name;
    program instructions for initiating a call to the called party served by the IP/PBX;
    program instructions for receiving an authentication certificate;
    program instructions for examining both the received authentication certificate and the caller name to determine if the registration authority to which the IP/PBX has been subscribed issued the authentication certificate in association with the caller name; and
    program instructions for establishing a dialog with a sender of the authentication certificate to authenticate the associated caller name if the authentication certificate was issued by the registration authority to which the IP/PBX has been subscribed.

18. The IP/PBX as claimed in claim 17, further comprising:
program instructions for conveying to a user device used by the called party to receive the call an indication of whether the caller name was authenticated.

19. A network gateway for providing an interface between a packet network and a switched circuit network, the network gateway comprising:
program instructions for registering registrants in a registry, wherein a particular public key is bound to a respective caller name for each registrant;
program instructions for issuing, by a registration authority, an authentication certificate after registering each registrant, wherein the registration authority vouches that each registrant is entitled to use the respective caller name;
program instructions for initiating a call to the called party served by the network gateway;
program instructions for receiving, from a registration authority, an authentication certificate;
program instructions for examining both the received authentication certificate and the caller name to determine if the registration authority to which the network gateway has been subscribed issued the authentication certificate in association with the caller name; and
program instructions for establishing a dialog with the registration authority to authenticate a caller name associated with the authentication certificate if the authentication certificate was issued by the registration authority to which the network gateway has been subscribed.

20. The network gateway as claimed in claim 19, further comprising:
program instructions for conveying to a user device used by the called party to receive the call an indication of whether the caller name was authenticated.

* * * * *